(12) United States Patent
Willberg et al.

(10) Patent No.: US 8,794,325 B2
(45) Date of Patent: Aug. 5, 2014

(54) METHOD OF PREPARING POLYMER-WATER EMULSION AND FURTHER SETTLING A STICKY POLYMER MATERIAL IN DOWNHOLE ENVIRONMENT

(75) Inventors: Dean Willberg, Tucson, AZ (US); Christopher N Fredd, Westfield, NY (US); Vadim Kamilievich Khlestkin, Novosibirsk (RU); Denis Olegovich Menshikov, Minsk (BY)

(73) Assignee: Schlumberger Technology Corporation, Sugar Land, TX (US)

( * ) Notice: Subject to any disclaimer, the term of this patent is extended or adjusted under 35 U.S.C. 154(b) by 11 days.

(21) Appl. No.: 13/146,076

(22) PCT Filed: Jan. 30, 2009

(86) PCT No.: PCT/RU2009/000036
§ 371 (c)(1),
(2), (4) Date: Nov. 12, 2011

(87) PCT Pub. No.: WO2010/087732
PCT Pub. Date: Aug. 5, 2010

(65) Prior Publication Data
US 2012/0061086 A1    Mar. 15, 2012

(51) Int. Cl.
*E21B 33/13* (2006.01)
*E21B 43/22* (2006.01)

(52) U.S. Cl.
USPC ............ 166/294; 166/279; 166/300; 507/203

(58) Field of Classification Search
None
See application file for complete search history.

(56) References Cited

U.S. PATENT DOCUMENTS

| 5,103,905 | A | 4/1992 | Brannon et al. |
|---|---|---|---|
| 7,080,688 | B2 | 7/2006 | Todd et al. |
| 2005/0058712 | A1 | 3/2005 | Serpelloni et al. |
| 2005/0272613 | A1 | 12/2005 | Cooke |
| 2007/0032386 | A1 | 2/2007 | Abad et al. |
| 2007/0298977 | A1 | 12/2007 | Mang et al. |
| 2008/0119374 | A1* | 5/2008 | Willberg et al. ............ 507/209 |

FOREIGN PATENT DOCUMENTS

| RU | 2143539 | 12/1999 |
|---|---|---|
| RU | 2311789 | 12/2007 |
| WO | 2006/137002 | 12/2006 |
| WO | 2008/062332 | 5/2008 |

OTHER PUBLICATIONS

A. Sodergard, M. Slot, Properties of lactic acid based polymers and their correlation with composition, Progress in Polymer Science (Oxford), 27(6), 2002, pp. 1123-1163.

A.P. Gupta, New emerging trends in synthetic biodegradable polymers—Polylactide: A critique; European Polymer Journal, vol. 43 (2007), pp. 4053-4074.

L.G. Torres, E.R. Zamoza, Preparation and power consumption of surfactant—fuel oil—water emulsions using axial, radial, and mixed impellers, Fuel, vol. 81 (2002), pp. 2289-2302.

(Continued)

*Primary Examiner* — Zakiya W Bates
(74) *Attorney, Agent, or Firm* — Rachel E. Greene; Tim Curington

(57) ABSTRACT

This invention relates to oil and gas production, more specifically, to the methods of producing polymer emulsion for downhole operations and mixing degradable (hydrolysable) polymer emulsion with the treatment fluid.

31 Claims, 4 Drawing Sheets

(56) References Cited

OTHER PUBLICATIONS

Auras, et al., "Mechanical, Physical, and Barrier Properties of Poly(Lactide) Films," Journal of Plastic Film and Sheeting, Apr. 2003, pp. 123-135, vol. 19(2).

Tsuji et al., "Water vapor permeability of poly(lactide)s: Effects of molecular characteristics and crystallinity," Journal of Applied Polymer Science, Mar. 5, 2006, pp. 2245-2222; vol. 99(5).
International Search Report mailed Oct. 29, 2009 for International Patent Application No. PCT/RU2009/000036, filed on Jan. 30, 2009, 2 pages total.

* cited by examiner

METHOD OF PREPARING POLYMER-WATER EMULSION AND FURTHER SETTLING A STICKY POLYMER MATERIAL IN DOWNHOLE ENVIRONMENT

BACKGROUND

The statements in this section merely provide background information related to the present disclosure and may not constitute prior art.

Some embodiments relate to oil and gas production, more specifically, to the methods of producing polymer emulsion for downhole operations and mixing degradable (hydrolysable) polymer emulsion with the treatment fluid.

Polyesters (i.e. polylactic acid (PLA) or polyglycolic acid (PGA)) as well as their mixtures and copolymers, polyorthoesters, polyanhydrides, polycarbonates or other degradable polymers (DP) are important materials known as environmentally safe plastics widely used for the production of polymer films, powders and fibers. For downhole operations, these materials are used in the form of fibers or powders as a proppant carrier or another formation rock permeability modifying material. Another form of these polymers are water emulsions that can be easily injected into the well.

Degradable polymers (DP) are preferable if the bond between the polymer and the formation rock should be reversible or temporary. Injection of various DPs into wells solves a number of problems such as permeability control, proppant and fine particulate migration, desired proppant location and proppant settling rate control in the well, the task of formation rock consolidation and bridging, acid treatment of formation, etc.

Various commercial degradable polymers are known (1-2) and many of which are specially designed for downhole applications. The preferred DP class are polyesters produced by polymerization of hydroxycarbonic acid, e.g. lactic acid polyesters known as polylactic acid (PLA), glycolic acid polyesters known as polyglycolic acid (PGA), 3-hydroxybutyric acid polyesters, 2-hydroxyvalerianic acid polyesters, e-caprolactone polyesters, hydroxyaminoacid esterification polyesters such as serine, trionine and tyrosine, soy protein type polypeptides, other polyesters and polyamides, polyanhydrides, polycarbonates, polyols (polyatomic alcohols), other downhole degradable polymers and copolymers derived from abovementioned monomers.

Several methods of DP delivery to the well and into the formations are known. In Patent Application US200502272613, incorporated by reference, it is suggested to deliver DP in the form of grains or viscous fluids. This required extra equipment (a storage grid in the DP injected well), high temperatures (about or above the polymer melting point) and injecting an inhomogeneous system which may hinder reliable operation of other equipment. DP delivery in protective shells (U.S. Pat. No. 7,080,688, incorporated by reference) allows producing acid monomers as the polymer degrades in the hydraulic fracture. Polymer delivery in the form of fibers was described in Patent Application WO2006137002A1, incorporated by reference.

Patent Application US20070032386, incorporated by reference, discloses a method of delivering degradable polymers (PLA or PGA) in the form of suspended small particles. The particle size of the degradable polymer is small enough to penetrate into the formation rock pores and produce a cake as a result of controlled polymer pyrolysis. This near wellbore treatment material was called Internal Filter Cake/Matrix Breaker. After hydrolysis into monomer acids, this material works as an efficient acid reactant for gel degradation.

However, the known DP delivery methods in solid state (suspended particles) require a preparation stage to provide polymer particles of the desired size. The rate and completeness of solid (suspended) polymer hydrolysis is difficult to control, because polymer swelling and hydrolysis are limited by diffusion of formation fluid into the degradable polymer particles.

This invention characterizes the preparation and delivery of DP into the well in the form of emulsion. Emulsions are two-phase (two liquids) systems wherein one phase is dispersed in the main media in the form of small particles (droplets). In the case considered herein, the dispersed fluid contains preliminarily dissolved polymer material. Because many emulsions have physical properties (viscosity, pipe friction, etc.) similar to those of usual treatment fluids, polymer emulsions can be added to wells using standard pumps and tubing.

Although degradable polymer emulsions are well known in industry (e.g. US2005/0058712, "Aqueous dispersion of at least one biodegradable polymer", incorporated by reference), little is known about the preparation of degradable polymer (DP) emulsions for downhole operations. Besides, the controllable decay of polymer emulsion remained beyond the coverage of this prior art.

One of downhole applications was characterized in Patent Application PCT/IB2007/054455 (Willberg et al.), incorporated by reference. That invention relates to solid acid polymers that produce active acids under specific conditions. More particularly, that invention relates to polyester materials that degrade to acids and also covers the use of those monomer acids for underground formation treatment.

It has been claimed that a solid acid precursor (e.g. PLA or PGA) can be dissolved in a non-toxic and inexpensive organic solvent and emulsify the solution in a disperser. The method was illustrated by using PLA and other acid precursors for the acid treatment of formations wherein acid was formed by polymer hydrolysis. In-the-field operations are easy with water emulsions of degradable polymers: the emulsion can be prepared and stored in tanks as a regular liquid and then delivered to the well using standard pumps and pipes.

Further DP degradation in the target environment depends strongly on downhole temperature and media pH.

However, many downhole operations require more rapid and controlled modification of physical properties of the treatment fluid (polymer droplet size, softened polymer settlement in underground formation pores, cohesion with solid particles added to the hydraulic fracturing fluid and macroscopic distribution of the polymer phase). This can be achieved by destructing the PLA water emulsion back to immiscible components (water and the organic phase).

Patent Application US2007/0298977A1 (Obtaining Degradable Particles and Related Methods, Halliburton), incorporated by reference, describes methods of obtaining hydrolysable particles near wellhead and methods of using hydrolysable polymer particles in the downhole environment. Under that method, the emulsion is used as an intermediate step in the production of a suspension of solid polymer particles suitable for delivery into the well and for the treatment of the formation rock.

The known method comprises the steps of preparing a mixture of said hydrolysable polymer and a first solvent, adding the ready mixture to a second solvent with a sufficient shear stress for obtaining emulsion in a wellhead plant. Then sufficient quantity of the first solvent is removed from the dispersed phase to form a phase of dispersed particles in a continuous phase (water).

At an intermediate step of preparing a polymer-in-water emulsion, the process efficiency can be controlled by adding surfactants.

Disadvantages of that technical solution are that the method requires the use of chlorine containing solvents (the first solvent for PLA taken as a hydrolysable polymer), the stability of suspended particles is difficult to control after mixture preparation in a wellhead blender and the resultant small solid particles may not have the physical properties as are required for a specific application.

It is therefore suggested to use emulsions suitable for the generation of sticky settleable (and hydrolysable) polymer in a well or in a well piping which is convenient for many downhole applications and to control the polymer settling process using a set of stabilizers and destabilizers. The method does not require any toxic or inflammable substances.

The object of some embodiments is to provide new methods of applying amorphous degradable polymers on well surface portions.

SUMMARY

Some embodiments relate to degradable polymer preparation (such as PLA, PGA, PLA/PGA copolymers) including the steps of composing the emulsion, preparing the emulsion and stabilizing or destabilizing the emulsion. The pumped polymer-water emulsion is destabilized from the initial metastable state by applying various factors such as adding chemicals or modifying the physical parameters (temperature, developed surface/formation rock contact etc.). This rapid emulsion decay changes the ambient physicochemical conditions of the polymer chains and induces rapid settling of the polymer from the emulsion and produces a sticky polymeric material. This soft (sticky) polymer acts as a formation rock treatment agent in the downhole environment. The main steps of preparing emulsions with desired properties are choosing a hydrolysable polymer with a suitable molecular weight, dissolution of that polymer in an organic solvent, reduction of the polymer molecular weight by means of hydrolysis, addition of stabilizers, addition of a surfactant to the organic or the water phase and intense dispersing of the organic phase (the hydrolysable polymer in the organic solvent with the surfactant) in the water phase.

Emulsions can be destructed with destabilizers that are already presented in the formation fluid or have been specially added to the treatment zone. The use of emulsion destructors destabilizes the emulsion and transforms the emulsified polymer to a sticky material consisting of polymer particles having various downhole applications.

BRIEF DESCRIPTION OF THE DRAWINGS

The manner in which the objectives of some embodiments and other desirable characteristics may be obtained is explained in the following description and attached drawings in which.

DETAILED DESCRIPTION

Figure 1:
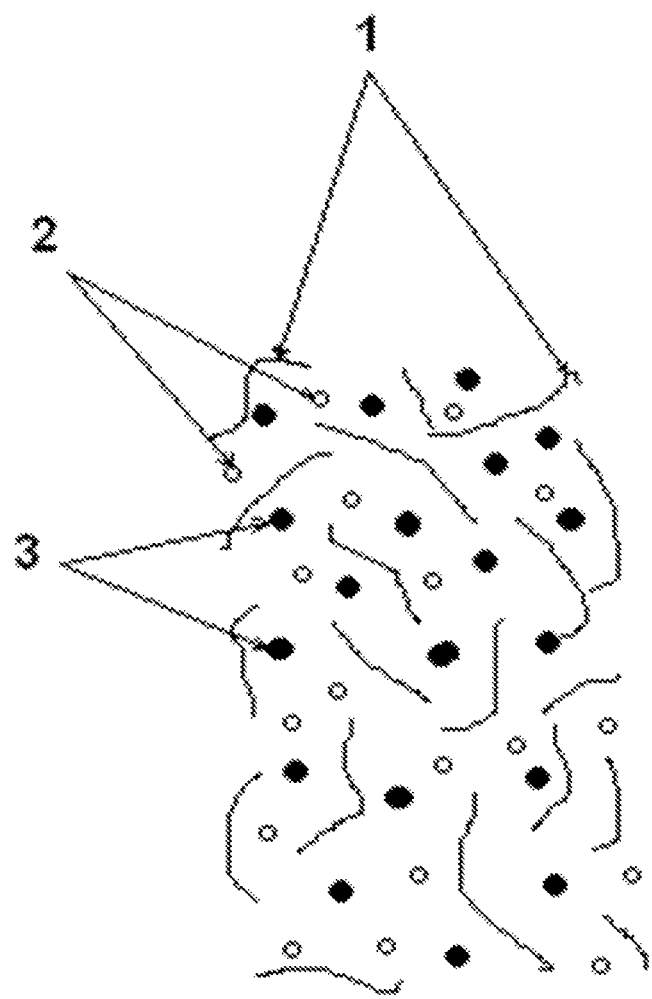
FIG. 1 and FIG. 2 illustrate the formation of a random suspended fiber mesh by destabilizing (triggering) a PLA emulsion in a water suspension of fibers and proppant particles.

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

It is suggested to achieve said object using the method of preparing water emulsion of at least one polymer hydrolysable in the downhole environment, said polymer being in the form of an organic phase dispersed in the water phase, wherein said organic phase comprises said polymer hydrolysable in the downhole environment, an organic solvent of said polymer, an emulsifier, a viscosity agent and at least one stabilizer. Said method comprises slow dissolution of said solid hydrolysable polymer in said organic solvent at a temperature that is typically above the polymer glass transition point, optionally cooling of the solution to 20-40° C., preparation of the treatment fluid in a separate blender with the addition of an efficient quantity of a surfactant, and the addition of the hydrolysable polymer solution to the treatment fluid with sufficiently intense stirring for the production of a stable emulsion. If necessary, the polymer dissolved in the organic solvent can be preliminarily hydrolyzed to the desired viscosity. If necessary, emulsion stabilizers can be added to the treatment fluid.

In some cases, the hydrolysable polymer is selected from a group containing lactic acid polymers, glycolic acid polymers, their copolymers and mixtures. The degradable polymer (DP) may be selected so that emulsion inversion in the downhole environment produces a sticky polymer material and the downhole hydrolysis is irreversible.

Typically, the solvent for said class of hydrolysable polymers is selected from a group of solvents having low volatility, low toxicity, high flammability temperature and, in some cases, degradable in the downhole environment.

In some instances, a solvent is used with a vapor pressure of less than 3-6 Pa at 20° C. and a flammability temperature above 90° C. Typically, said solvent pertains to the class of dibasic esters (DBE): DBE-4, DBE-5, DBE-6 and their mixtures.

Typically, the emulsifier is a cationic, anionic, or nonionic surfactant. The fluid may be emulsified in a high-speed disperser, a spray injector or a field blender. Typically, said stabilizer and said surfactant are added to the water phase.

The emulsion stabilizer may be selected from a group containing polymers, fine powders, fibers and chemical reactants. Typically, gelatin is used as said emulsion stabilizer.

It is suggested to achieve the objective by using a water emulsion including at least one polymer hydrolysable in the downhole environment, the water emulsion being in the form of an organic phase dispersed in the water phase, wherein the organic phase contains a polymer hydrolysable in the downhole environment, an organic solvent of the polymer also hydrolysable in the downhole environment, an emulsifier, a viscosity agent and at least one stabilizer. The emulsion can include a hydrolysable polymer selected from lactic acid polymers, glycolic acid polymers, their copolymers and mixtures. Typically, the emulsion also contains a solvent from the class of hydrolysable polymers selected from solvents having low volatility, low toxicity, high inflammation temperature and degradable in the downhole environment. The emulsion may have a solvent with a vapor pressure of less than 3-6 Pa at 20° C. and an inflammation temperature of >90° C. The solvent may even be from the class of dibasic esters (DBE): DBE-4, DBE-5, DBE-6 and their mixtures. The emulsifier can be a cationic, anionic or nonionic surfactant. Typically, the emulsion has a stabilizer selected from polymers, fine powders, fibers and chemical reactants. Gelatin may be used as the emulsion stabilizer.

The polymer used may be capable of naturally hydrolyzing in the downhole environment after the completion of the fluid control operations, wherein the hydrolysis rate depends on temperature, salinity, pressure and pH of the environment and the length of the polymer chains in the settled polymer material.

It is suggested to achieve said object using a method of settling a sticky polymer material for isolation of a portion of formation rock or controlling the bottomhole surface or zone permeability comprising the steps of delivering, to the settlement zone, of a sticky polymer material of the water emulsion described above and developing conditions for emulsion destruction and the formation of an amorphous polymer. As an example, emulsion destruction is initiated by exposing said emulsion to multivalent cations, increasing temperature or contacting the emulsion with developed surfaces. Preferably, if multivalent cations are used, the solution, containing said multivalent cations, is additionally injected into the well, or a formation rock penetrating multivalent cation containing solution is used. In the embodiments of the method, emulsion is typically delivered to the treatment zone through a flexible production string, and said multivalent cation containing solution is injected through the annular space. Contrary delivery embodiment is possible. Emulsion can be delivered to the well by adding it to the proppant or by direct spraying onto the proppant before proppant mixing with the fluid, or emulsion is delivered to the well by adding to the treatment solution as an addition, or emulsion is delivered to the well through a separate delivery line comprising a flexible production string, and the hydrofracturing liquid is injected through the annular space. In some cases where delayed destruction is desired, emulsion is mixed with slowly soluble calcium or magnesium salts as well as with encapsulated salts or wax or oil coated salt crystals.

The choice of solvents for dispersing the hydrolysable polymer to emulsion was described in Patent Application PCT/IB2007/054455, incorporated herein. That patent application also contains a detailed description of the hydrolysis of a hydrolysable polymer (PLA) for molecular weight reduction (adjusting the viscosity).

The procedure described below comprises several steps. It will be evident for those skilled in the art that some steps can be modified or excluded.

A PLA emulsion preparation method was described in Patent Application PCT/IB2007/054455. However, another method was developed and tested afterward. This method includes the following stages:

1. Slow dissolution of the solid hydrolysable polymer (supplied in the form of grains, powder, balls, or chips) in an organic solvent at a temperature above the polymer glass transition point to complete dissolution. The concentrated solution may contain up to about 80% (by weight) of the initial quantity of polymer.

2. If the viscosity of the concentrated solution is too high for the operation of the disperser used (a blender), said viscosity typically being required not to exceed about 1 to 2 Pa·s, then (an optional step) the polymer dissolved in the organic solvent (DP) is hydrolyzed into a solution with the required viscosity (the hydrolyser cleaves the polymer chains thereby reducing the molecular weight of the polymer).

3. Optionally, the polymer solution in the organic solvent is cooled to about 20 to 40° C.

4. A treatment fluid having the desired density and viscosity is prepared in a separate blender. The treatment fluid is modified with an efficient quantity of a surfactant for further emulsion preparation.

5. In some embodiments of the method, the treatment fluid is modified with emulsion stabilizers.

6. The hydrolysable polymer solution is added to the treatment fluid with sufficiently intense stirring for the production of a stable emulsion.

7. Also possible is embodiment of the method for which the treatment fluid containing a hydrolysable polymer emulsion is injected into the well.

At the first stem of the method, a commercially available DP is dissolved in a suitable organic solvent. The preferable class of solvents under this invention includes mixtures of dibasic esters (DBE) as they are safe DP solvents weakly soluble in the water phase. Moreover, solvents of this class are safe for personnel (a high inflammation point) and capable of degrading to form natural dibasic acids, i.e. are environmentally suitable. A mixture of DBE-4 and DBE-5 has a sufficiently high solvent power for PLA (Table 1, row 1). One can see from this Table that alternative solving agents for degradable polymers, such as acetonitrile, acetone, ethyl acetate may be used, but not optimal for the objectives of some embodiments, as they are volatile and more flammable organic solvents.

Typically, fast dissolution of a hydrolysable polymer requires rapid stirring in a mixer (blender) and keeping temperature at above the DP glass transition point (>65° C. for PLA). A viscous polymer solution is produced at this step.

The emulsion preparation technology (the organic phase is the hydrolysable polymer in an organic solvent, and the water phase is gel) is basically the same as the viscous oil or oil product water emulsion technology. The high difference in the viscosities of the contacting phases produces a large shear stress at the phase boundary favoring the dispersion of the organic phase to small stable drops. The mixing equipment and possible viscosity ranges for the source liquids are well-known [3]. The mixer can be, for example, a Lightning Labmaster SI (USA) with a Lightning A310 impeller. At a suitable mixer speed and loading conditions as per the machine specifications, Class 3 and Class 4 emulsions are produced. Class 3 emulsions are sour-cream like homogeneous emulsions, and Class 4 ones are excellent emulsions having a very high stability.

Emulsion stability may vary, and emulsion technology can be selected to achieve the desired emulsion stability. The term 'stability' (e.g. of an oil water emulsion) means the time required for the dispersed phase (e.g. polymer in solution) completed the transition from a dispersion to a continuous layer. The presence of a strong potential barrier between the drops increases emulsion stability. The strength of that barrier depends on the type and concentration of the surfactant and the stabilizer used in the technology and the viscosity and salinity of the water phase, and the magnitude of the strength is well-known from the Deryagin-Landau-Fairway-Overback theory and the hydrophilic-lipophilic balance law.

The emulsion stability period required depends on specific task. If emulsion is prepared in the field, its stability should be several hours to several days. If emulsion is prepared elsewhere and supplied to the site, its stability should be days or weeks.

It was found, for example, that emulsion stability decreases dramatically in the presence of $Ca^{2+}$ ions dissolved in water or in guar gel.

The second step of the method may be required if the viscosity of the concentrated solution is too high for efficient emulsifying (this parameter is dependent on the design and power of the blender used for emulsification; for standard equipment the viscosity limit is about 1 to 2 Pa·s), or if the ready polymer water emulsion is insufficiently homogeneous and stable (typically, PLA water emulsion is stable during a week at room temperature). Then the polymer solution is preliminarily hydrolyzed to reduce the molecular weight of the macroscopic molecules and hence reduce the viscosity.

If the DP in question is a polyester, then heating in an ammonium salt solution (preferably, ammonium carbonate which decomposes upon heating to gaseous products and does not contaminate the mixture) is sufficient to separate a polymer chain and form amides. This reduces DP solution viscosity to a level suitable for further emulsification (<2 Pa·s).

The third step of the emulsion technology comprises intense stirring of water (or a water based gel) with a DP solution and a surfactant to produce an emulsion remaining homogeneous and stable for several days. The mixture can be modified with a stabilizer in a quantity of about 0 to 20% of the hydrolysable polymer content. Of various commercially available emulsion stabilizers, the most efficient and affordable is gelatin.

Any emulsifying surfactant capable of forming hydrolysable polymer water emulsion can be used in emulsion preparation methods. Emulsifying surfactant can be cationic, anionic or nonionic surfactants. In some embodiments, the quantity of surfactant is 0.1 to 5% of the hydrolysable polymer content. Preferable surfactants are polyethylene glycol derivatives and $C_6$-$C_{10}$ alcohol ethoxysulfates.

Further details of polymer emulsion preparation steps are illustrated in Example 1.

Typically, PLA water emulsion at room temperature, as described in Example 1, remains stable for several weeks. The aim of destructing the emulsion is to rapidly settle the hydrolysable polymer in the form of amorphous sticky material (soft polymer) droplets that are used to modify the rheology of well fluids and for formation rock treatment.

If emulsion is destructed by applying one of the destabilizing factors, the surfactant loses the ability to sustain the stability of the organic phase droplets (the emulsion destructor 'kills' the surfactant or replaces the stabilizer on the drop surface). Emulsion destabilizer may destruct the emulsion by the following mechanisms: stabilizer replacement on the drop surface, chemical binding of the stabilizer, drop charge removal etc. Generally, there are two possible methods of emulsions so prepared.

(1) Organic layer separation: the DBE-DP layer forms under the water surface (demulsification only).

(2) The organic solvent does not produce a continuous layer but partially mixes with water to increase water concentration in non-water drops, thereby causing DP settling (in this case, PLA) in the form of an amorphous sticky material that sticks to the fibers, proppant and solid surfaces.

The final condition of such a suspension is shown schematically in FIG. 1 for a specific treatment fluid composition.

Figure 2:
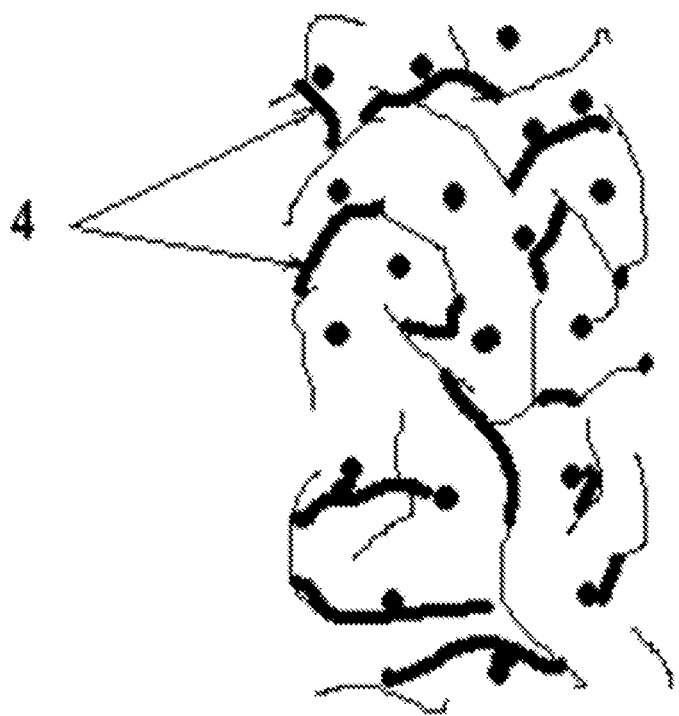

FIG. 1 and FIG. 2 illustrate the formation of a random suspended fiber mesh by destabilizing (triggering) a PLA emulsion in a water suspension of fibers and proppant particles. It can be seen that the initial mixture of emulsion and fiber suspension (FIG. 2) produces a random three-dimensional network of the fibers during the formation of sticky PLA particles. The new suspension has very low settling rate and does not obey the Stokes law for settling of round-shaped particles in a pure Newtonian liquid. The fluid rheology is modified not by the extra viscosity of the polymer particles but by the formation of a 3D network in the suspension of fibers and proppant.

The notations in FIG. 1 are as follows: (1) suspended fibers, (2) suspended proppant particles, and (3) PLA emulsion drops (stable).

FIG. 2 shows the evolution of the same suspension after contact with a emulsion destabilizing agent: now we observe are soft polymer particles (4) resulting from emulsion destruction and having strong adhesion to other suspended particles in the fracturing fluid.

There are several methods (addition of chemical reactants, heating, ultrasonic treatment, pumping through small pores, surface interaction, contact with fibers or powder etc.) of transforming a polymer emulsion back to immiscible liquid phases. Three possible methods are described below only as general examples of emulsion behavior.

1. Temperature-initiated emulsion decomposition;
2. Reactant initiated emulsion decomposition;
3. Physical methods, e.g. polymer emulsion contacting with developed surfaces.

Figure 3:
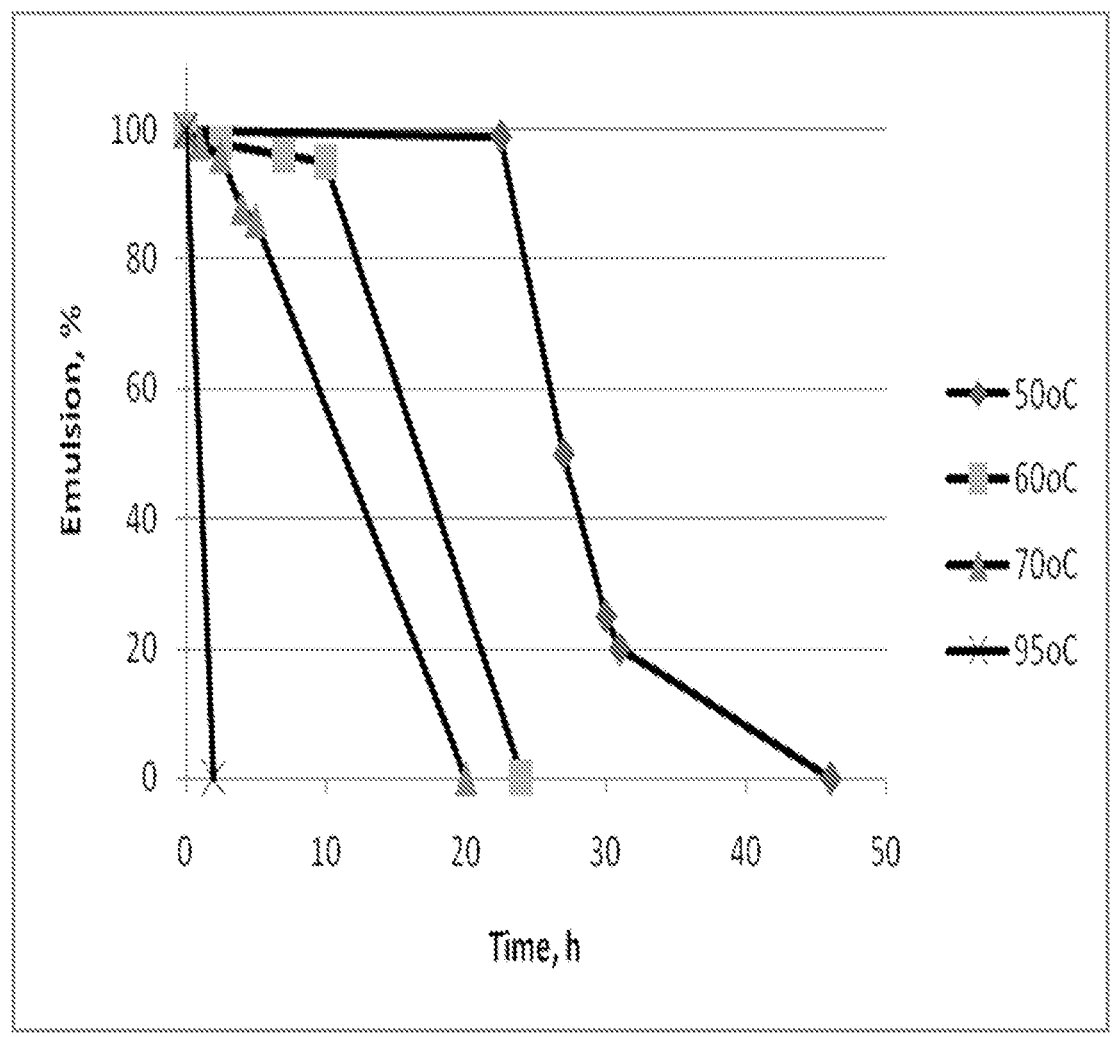
FIG. 3 shows the thermal destruction diagram of an emulsion.

FIG. 3 shows the thermal destruction diagram of an emulsion. The emulsion destructs (decays) immediately at 95° C. or it takes 23 hours at 50° C. Heat initiated destruction of emulsions produces separate layers of water and organic phase (without PLA settling from the organic solvent).

The main object of this invention is to destruct the injected emulsion in the well to produce a sticky organic phase (soft and sticky polymer) settling on well surfaces. The emulsion destruction rate is very important for PLA settling from emulsion. This process can be controlled by adding destabilizers.

Emulsion destabilizers can be various types of polymers, solid particles, fibers, surfactants or salts. Destabilization efficiency is easily assessed in laboratory before in-the-field operations. Some approaches to the selection of a suitable destabilizer are shown below.

Table 2 and Example 2 describe preferable classes of emulsion destabilizers. Note that emulsion destruction with ions $Ca^{++}$, $Ba^{++}$, $Ce^{+++}$ and other polyvalent cations causes rapid emulsion destruction and PLA particle settling. Univalent cations ($K^+$, $Na^+$ at high concentrations) are given for illustration only because they usually cause phase separation without liquid particle settling.

Moreover, a DP water emulsion can be destructed by contacting with strongly developed surfaces such as porous materials. For example, a PLA water emulsion becomes unstable on a thin layer on glass and rapidly decomposes at the glass/emulsion phase boundary. However, PLA emulsion remains stable on samples of aluminum foil, Teflon, plastics and metallic surfaces. This latter confirmed property of PLA emulsion allows it to remain unchanged (quasi-stable) while pumping through steel pipes to the downhole target. Then the emulsion may destruct after contact with strongly porous formation rocks typical for oil and gas reservoirs.

Furthermore, emulsion can be stabilized using solid particles, natural or synthesis polymers, surfactants and fibers. Steric stabilizers pertain to a class of reactants that are well known in the technology of stable water oil emulsions. Gelatin is an example of a natural stabilizing polymer capable of inhibiting the action of emulsion destabilizer ($Ca^{++}$) as shown in Example 3.

The latter step of this degradable emulsion preparation and delivery method comprises emulsion injection into the desired well interval and the delivery of a destabilizer. Because emulsion viscosity during its stability period is close to the viscosity of treatment fluids used for zone isolation and formation rock permeability control, the delivery methods will be clear and known to those skilled in art.

Emulsion destabilizers can be delivered through flexible production strings (i.e., coil-tubing) and other pipes via the annular space. This allows achieving controlled emulsion destruction in the emulsion and solution mixing zone.

Emulsion destabilizers may be present in the form of suspended particles or in other chemical or physical forms allowing the destabilizer's release to be delayed for delayed destabilization of the emulsion.

Depending on the formation rock being treated, emulsion destabilizers may be present in a solute form in the formation rock itself (thus eliminating the need to deliver any destabilizer to the well). For example, carbonate rocks inherently contain a rich amount of $Ca^{++}$ ions known to be an efficient emulsion destabilizer: this contact with ions-bearing formation cause the settling of soft polymer particles in carbonate rocks.

Example 1

Example 1 shows three main steps of the preparation of a stable lactic acid polymer (PLA) in a water solution.

(1) 1 kg of 20% PLA solution is produced by slow stirring of PLA grains (amorphous polymer purchased from Nature-Works (USA, grade 4060D) for 2 hours in a sufficient quantity of a mixture of dibasic esters (DBE) at the temperature of 60-70° C. The DBE is a mixture of 0.3 kg commercially available DBE-2 (mixture of DBE-3 and DBE-4) and 0.5 kg DBE-6.

(2) To reduce PLA solution viscosity, molecular weight reducer was added in the form of a 20 g ammonium carbonate solution in 0.14 liter of water. Reaction of some ester groups of the polymer with ammonia molecules breaks the ester bonds to produce amide terminal radicals, thus reducing the length of the PLA molecules. To reduce the molecular weight of PLA, 1 kg of 20% PLA solution in DBE was modified with 25 g ammonium carbonate solution. The mixture was held at 95° C. for 1 hour.

(3) 1 kg guar based gel (grade WF120) was modified with 5 ml of an 85% by weight solution of ammonium fatty alcohol ether sulfate surfactant in ethylene glycol monobutyl ether, and 30 ml DBE. After mixture heating to 90° C. and thorough stirring in a blender, 1 kg of 20% PLA solution in DBE mixture prepared in step (2) was added, and the resultant mixture was emulsified followed by ice (or cold water) chilling.

This technological sequence produces a stable water emulsion of PLA solution in DBE. The emulsion properties remain stable for 10 days at room temperature.

This is an example of preparing a stable water emulsion of PLA solution in DBE that is suitable for downhole operations.

Example 2

Example 2 illustrates the choice of optimum emulsion destabilizer (de-emulsifier) for water emulsion of PLA solution in DBE (water viscosity was increased by adding gel).

The complete time of emulsion destruction by a salt solution is shown in Table 2 for different salt concentrations.

The treatment fluid for this experiment contained 50% organic phase (PLA/DBE=1:4), 49.75% gel (guar based gel, grade WF120) and 0.25% of the above described surfactant in example 1.

The best example of emulsion destabilizer for the objectives of this invention is calcium chloride—this salt is efficient and affordable.

Example 3

Stabilizer Test

Emulsion destruction caused by $CaCl_2$ destabilizer is delayed for several hours by a moderate quantity of gelatin as an emulsion stabilizer.

Figure 4:
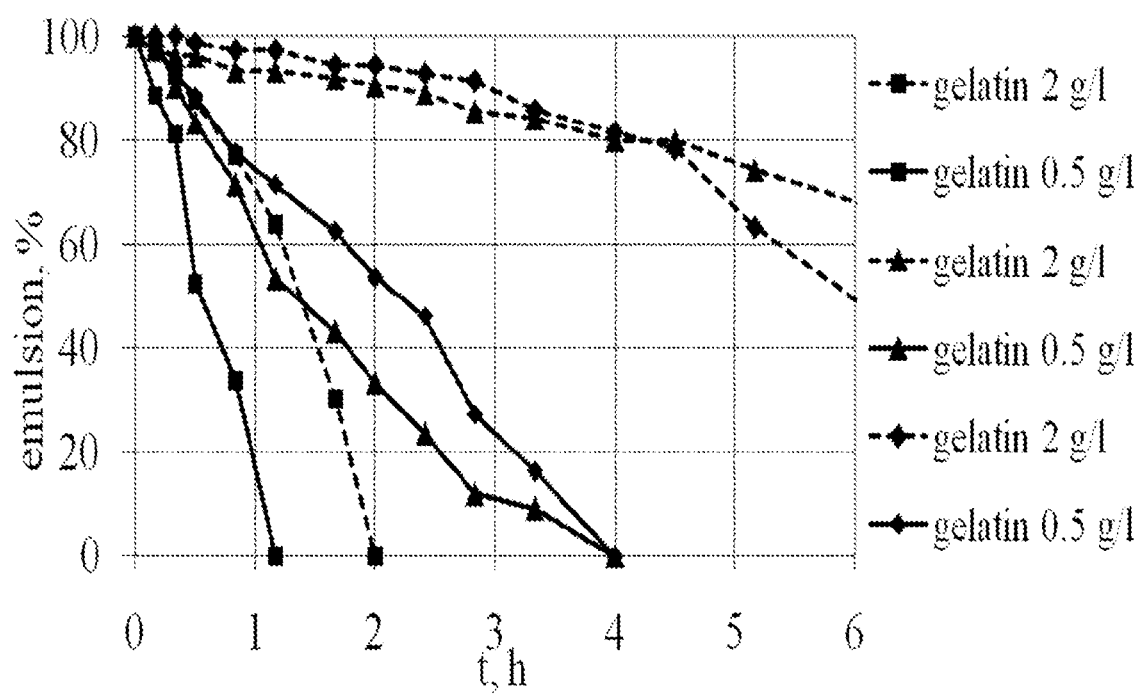
FIG. 4 illustrates an example of emulsion destruction with stabilizer and delayed emulsion destructor.

An example of emulsion destruction with stabilizer and delayed emulsion destructor is shown in FIG. 4.

An emulsion with 10% PLA decomposes in the presence of $CaCl_2$ salt. Without gelatin stabilizer in the mixture, emulsion destructs completely in 10 minutes. Gelatin delays emulsion destruction. Emulsion destruction is judged about from visible phase separation extent.

Emulsion stabilization by gelatin is not due to an increase in viscosity (guar gel viscosity is high by itself, and small gelatin addition has no effect) but due to gelatin adsorption on emulsion drop surfaces.

The foregoing disclosure and description of the invention is illustrative and explanatory thereof and it can be readily appreciated by those skilled in the art that various changes in the size, shape and materials, as well as in the details of the illustrated construction or combinations of the elements described herein can be made without departing from the spirit of the invention. None of the description in the present application should be read as implying that any particular element, step, or function is an essential element which must be included in the claim scope: THE SCOPE OF PATENTED SUBJECT MATTER DEFINED ONLY BY THE ALLOWED CLAIMS. Moreover, none of these claims are intended to invoke paragraph six of 35 USC section 112 unless the exact words "means for" are followed by a participle. The claims as filed are intended to be as comprehensive as possible, and NO subject matter is intentionally relinquished, dedicated, or abandoned.

NON-PATENT REFERENCES (each of which is incorporated herein)

1. A. Sodergard, M. Slot, Properties of lactic acid based polymers and their correlation with composition, Progress in Polymer Science (Oxford), 27(6), 2002, pp. 1123-1163;
2. A. P. Gupta, New emerging trends in synthetic biodegradable polymers—Polylactide: A critique; European Polymer Journal, vol. 43 (2007), pp. 4053-4074;

3. L. G. Torres, E. R. Zamoza, Preparation and power consumption of surfactant-fuel oil-water emulsions using axial, radial, and mixed impellers, Fuel, vol. 81 (2002), pp. 2289-2302.

TABLE 1

Properties of Potential Solvents for PLA

|  | DBE-4 | DBE-5 | DBE-6 | Aceto-nitrile | Acetone | Ethyl acetate |
|---|---|---|---|---|---|---|
| PLA Solubility*, wt. % | 40 | 15 | 5 | 25 | 50 | 35 |
| Boiling Point, °C. | 196 | >210 | >227 | 82 | 56 | 77 |
| Inflammation Point, °C. | 94 | 107 | 113 | 16 | −20 | 2 |
| Vapor Pressure, kPa | $18 * 10^{-3}$ | $7 * 10^{-3}$ | $1 * 10^{-3}$ | 0.025 | 0.18 | 0.073 |
| Solubility in Water, wt. % | 7.5 | 4.3 | 2.1 | ∞ | ∞ | 12 |
| Solubility for Water, wt. % | 3.8 | 3.2 | 2.4 | ∞ | ∞ | 9.7 |

*after 6-7 h at 70° C.
DBE = $MeO_2C(CH_2)_nCO_2Me$; n = 2-4

TABLE 2

List of Cationic Destabilizers for Polyester Polymer Emulsion with Surfactant

| Salt | C, g/l | Time for decays, hs |
|---|---|---|
| $CoCl_2$, $ZnCl_2$, $NiCl_2$, $FeCl_2$, $CuSO_4$, $MgCl_2$ | 0.2 | 12 |
| $CaCl_2$ | 0.2 | 2.0 |
| $Ce_2(SO_4)_3$, trimethyl-octadecylammonium chloride | 0.2 | 0.2 |
| $CaCl_2$, $H_2SO_4$, NaOH | 2.0 | 0.5 |
| KCl | 10 | 0.2 |

What is claimed is:

1. A method of treating a formation using at least one polymer hydrolysable in a downhole environment, comprising:
incorporating the at least one polymer into an organic phase, wherein the organic phase comprises an organic solvent, an emulsifier, and a viscosifying agent;
mixing the organic phase with a water phase with intense stirring to produce an emulsion at surface conditions, and
inducing the emulsion to decompose in downhole conditions to produce droplets of sticky polymer.

2. The method of claim 1 wherein the hydrolysable polymer is at least one member selected from the group consisting of a polylactic polymer, a polyglycolic polymer, a copolymer of lactic acid and glycolic acid, and a mixture thereof.

3. The method of claim 1, wherein the organic solvent for the hydrolysable polymer is selected from the group of solvents having low volatility, low toxicity, high flammability temperature, and degradable in the downhole environment.

4. The method of claim 3, wherein the organic solvent has a vapor pressure of less than about 3 to about 6 Pa at 20° C.

5. The method of claim 3, wherein the organic solvent has a flammability temperature above about 90° C.

6. The method of claim 3, wherein the organic solvent belongs to a class of dibasic esters (DBE) comprising DBE-4, DBE-5, DBE-6 and their mixtures.

7. The method of claim 1, wherein the emulsifier is one of a cationic, anionic or nonionic surfactant.

8. The method of claim 1, wherein the organic phase and water phase are emulsified in a high-speed disperser, a spray injector, or a field blender.

9. The method of claim 1, wherein the emulsion further comprises a stabilizer is selected from the group consisting of a polymer, a fine powder, a fiber and a chemical reactant.

10. The method of claim 9, wherein the stabilizer is gelatin.

11. The method of claim 1, wherein the polymer irreversibly hydrolyses in the downhole environment.

12. The method of claim 1, wherein the polymer is capable of irreversible hydrolyses in the downhole environment.

13. A water emulsion comprising at least one polymer hydrolysable in the downhole environment, the water emulsion being in the form of an organic phase dispersed in the water phase, wherein the organic phase comprises the polymer hydrolysable in the downhole environment, an organic solvent, an emulsifier, a viscosity agent, and at least one stabilizer, wherein the at least one stabilizer is gelatin.

14. The emulsion of claim 13, wherein the emulsion comprises a hydrolysable polymer selected from a group consisting of a polylactic polymer, a polyglycolic polymer, a copolymer of lactic acid and glycolic acid and a mixture thereof.

15. The emulsion of claim 13, wherein the organic solvent for said class of hydrolysable polymers is selected from a group of solvents having low volatility, low toxicity, high flammability temperature and degradable in the downhole environment.

16. The emulsion of claim 15, wherein the organic solvent has a vapor pressure of less than about 3 to about 6 Pa at 20° C.

17. The emulsion of claim 15, wherein the organic solvent has a flammability temperature above 90° C.

18. The emulsion of claim 15, wherein the organic solvent is from the class of dibasic esters (DBE) comprising DBE-4, DBE-5, DBE-6 and their mixtures.

19. The emulsion of claim 13, wherein the emulsifier is one of a cationic, anionic or nonionic surfactant.

20. The emulsion of claim 13, wherein the stabilizer is selected from the group consisting of a polymer, a fine powder, a fiber and a chemical reactant.

21. A method of settling a sticky polymer material for isolation of a portion of formation rock or controlling downhole surface or zone permeability, comprising:
delivering, to a settlement zone, a sticky polymer material in the form of water emulsion as described in claim 13; and
developing conditions for emulsion destruction and producing the sticky polymer material.

22. The method of claim 21, wherein developing conditions for emulsion destruction comprises exposing said emulsion to a multivalent cation, increasing a temperature, or contacting the emulsion with a developed surface.

23. The method of claim 22, wherein the developing conditions for emulsion destruction comprises injecting a solution containing an emulsion destructing factor into a well.

24. The method of claim 22, wherein the emulsion is delivered to the treatment zone through a flexible production string, and the multivalent cation is injected through an annular space.

25. The method of claim 22, wherein the emulsion is delivered to the treatment zone through an annular space, and the multivalent cation is injected through a flexible production string.

26. The method of claim 21, wherein the developing conditions for emulsion destruction comprises using a formation penetrating solution with the emulsion decay factor.

27. The method of claim 26, wherein the emulsion decay factor has a delayed action.

28. The method of claim 21, wherein the emulsion is delivered to a well by adding it to proppants or by direct spraying said emulsion onto proppants before proppant mixing with a fluid.

29. The method of claim 21, wherein the emulsion is delivered to a well by adding to a treatment solution as an addition.

30. The method of claim 21, wherein the emulsion is delivered to a well through a separate delivery line comprising a flexible production string, and a hydrofracturing liquid is injected through a annular space.

31. The method of claim 21, wherein the developing conditions for emulsion destruction is achieved by mixing said emulsion with a slowly soluble calcium or magnesium saltor with an encapsulated saltor wax- or oil-coated salt crystal.

\* \* \* \* \*